R. DE FAZI.
PROCESS OF ALCOHOLIC FERMENTATION.
APPLICATION FILED JAN. 26, 1914.
1,140,882.
Patented May 25, 1915.
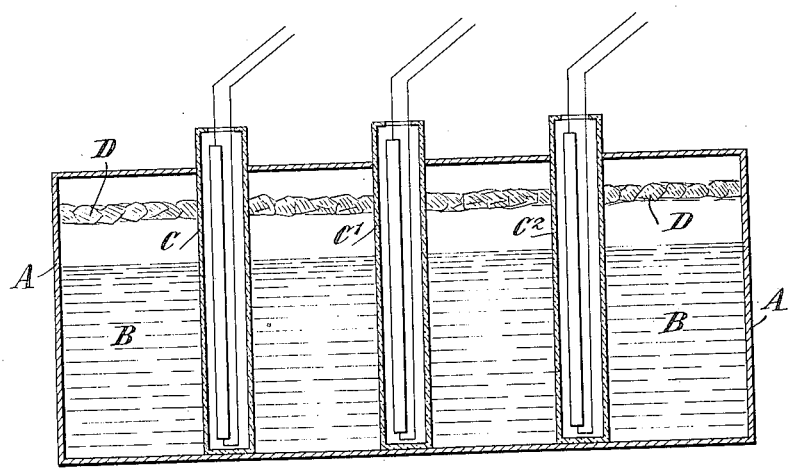
INVENTOR:
Romolo de Fazi
BY
ATTY.

UNITED STATES PATENT OFFICE.

ROMOLO DE FAZI, OF ROME, ITALY.

PROCESS OF ALCOHOLIC FERMENTATION.

1,140,882.

Specification of Letters Patent. Patented May 25, 1915.

Application filed January 26, 1914. Serial No. 814,343.

*To all whom it may concern:*

Be it known that I, ROMOLO DE FAZI, a subject of the King of Italy, residing at Rome, Italy, chemist, (whose post-office address is 60 Via della Consulta, Rome, Italy,) have invented a new and useful Process of Alcoholic Fermentation, of which the following is a specification.

In the alcoholic fermentation of directly fermentable sugars and other carbohydrates to be saccharified before the fermentation, the main reaction, that is to say transformation of fermentable substances into alcohol and carbonic acid, is accompanied by secondary reactions causing secondary products, such as lactic acid, higher alcohols, etc., to be formed.

Various ways have been proposed for limiting or preventing the formation of such secondary products, such as 1. the use of pure cultures of yeast; 2. sterilization by special methods so as to produce an action on the micro-organisms and ferments forming the cause of formation of the said secondary products; 3. addition of disinfecting substances (the latter, however, with scarce success).

The said secondary fermentations are caused by bacteria or other micro-organisms, present even in pure cultures of yeast, and thus forming the cause of diminution of production.

From Downes' and Blunt's diligent experiments and Buchner's and S. Bang's continuous researches (see Jörgensen, "*Die Mikroorganismen der Gärungsindustrie*," 5th edition, Berlin, 1909, page 91) results are obtained showing that the action of light is not favorable to the life of micro-organisms, and Lucien Levy in "*Les Moûts et les Vins en Distillerie*," Paris 1903, page 182, says that the prolonged action of light is unfavorable to the moldiness. Also in Brit. Pat. 9003/1896 alimentary substances are treated with Röntgen rays, and in German Pat. 81228 of 1895 sterilizing with electric current is described. Also water has been sterilized with the light of mercury vapor lamps. All this has induced applicant to study the action of light and specially the action of ultra-violet rays on the fermentation of sugared liquids, and liquids obtained by saccharification of amylaceous body products (by diastase or mucedines).

Applicant has found that the action of light and specially the action of ultra-violet rays is favorable to alcoholic fermentation. In fact, in numerous experiments made in careful comparison with fermentation without the action of light a better yield of alcohol has always been found to be obtained with the action of ultra-violet rays and also a greater purity of the substances obtained in the distillation of the products of fermentation. As sources of ultra-violet rays both solar and artificial light may be used, but particularly the radiations of Uviol lamps. It is indifferent for the purposes of the present invention whether the favorable effect of light is to be ascribed to a damaging action on the other micro-organisms or to the intensification of the action of yeast, or to both causes. From applicant's experiments it is found that it is advantageous in the alcoholic fermentation to add to the liquid to be fermented a small quantity of cellulose which is thoroughly mixed with the liquid and raised in the alcoholic fermentation by the carbonic acid generated thereby, so as to form a kind of protecting cover on the body of the fermenting liquid.

It has also been found advantageous to use yeast produced under the action of ultra-violet rays. The use of such yeast is advantageous even if the fermentation is carried out without the action of ultra-violet rays.

An apparatus suitable for use in connection with my process is shown in the drawing, wherein A designates the fermenting tank which is adapted to contain the fermenting liquid B. A number of Uvoil lamps C, $C^1$ and $C^2$ are introduced through openings in the top of the tank and project to the bottom of the same so as to be immersed in the liquid B. A layer of cellulose D is provided above the liquid.

My new process of fermentation may be carried out by introducing sources of ultra-violet rays into the fermentation tanks, the number of lamps and intensity of rays depending upon the more or less deep coloring of the liquid and size of tanks, provided a sufficiently intense radiation is obtained throughout the liquid. In case of the liquids being very deeply colored they may be diluted or discolored by known methods. Instead of introducing the sources of ultra-violet rays into the tanks the latter may also be made of transparent material, such as Uviol glass, or provided with Uviol glazed openings. In the latter case, however, there must not be too thick layers of liquid.

Having now fully described my said invention and the manner in which the same is to be performed, I declare that what I claim as my invention is:

1. The process of alcoholic fermentation of sugared liquids, and liquids obtained by saccharification from amylaceous substances, consisting in exposing the liquid to ultraviolet rays during the fermentation.

2. The process of alcoholic fermentation of sugared liquids, and liquids obtained by saccharification from amylaceous substances, consisting in exposing the liquid to ultraviolet rays during the fermentation, and in adding cellulose to the fermenting liquid.

3. The process of alcoholic fermentation of sugared liquids, and liquids obtained by saccharification from amylaceous substances, consisting in exposing the liquid to ultraviolet rays during the fermentation, and in using yeast in the fermentation which has been cultivated under the action of ultraviolet rays.

In testimony whereof I have signed my name to this specification in the presence of two subscribing witnesses.

ROMOLO DE FAZI.

Witnesses:
   DUITIS NARDONI,
   TOMMASO BORTOLUZZI.